United States Patent [19]
Ikebata

[11] Patent Number: 5,923,793
[45] Date of Patent: *Jul. 13, 1999

[54] HANDWRITTEN CHARACTER RECOGNITION APPARATUS WITH AN IMPROVED FEATURE OF CORRECTION TO STROKE SEGMENTATION AND METHOD FOR CORRECTION TO STROKE SEGMENTATION FOR RECOGNITION OF HANDWRITTEN CHARACTER

[75] Inventor: Yoshikazu Ikebata, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,366

[22] Filed: Dec. 28, 1995

[30] Foreign Application Priority Data

Dec. 28, 1994 [JP] Japan .................................... 6-327473

[51] Int. Cl.$^6$ .............................. G06K 9/03; G06K 9/34; G06K 9/00; G06K 9/48
[52] U.S. Cl. .......................... 382/311; 382/179; 382/189; 382/200; 382/203; 382/310
[58] Field of Search .................................... 382/177, 178, 382/179, 185, 186, 187, 188, 189, 199, 200, 203, 309, 310, 311, 123; 345/173, 179, 326; 364/737; 707/530

[56] References Cited

U.S. PATENT DOCUMENTS

| | | | |
|---|---|---|---|
| 4,731,857 | 3/1988 | Tappert ..................................... | 382/178 |
| 4,764,972 | 8/1988 | Yoshida et al. ........................... | 382/187 |
| 4,933,977 | 6/1990 | Ohrishi et al. ........................... | 382/178 |
| 4,972,496 | 11/1990 | Sklaren .................................... | 382/187 |
| 5,161,245 | 11/1992 | Fenwick .................................. | 382/177 |
| 5,265,171 | 11/1993 | Sanger ..................................... | 382/177 |
| 5,341,438 | 8/1994 | Clifford ................................... | 382/187 |
| 5,455,901 | 10/1995 | Friend et al. ............................ | 382/187 |
| 5,500,937 | 3/1996 | Thompson-Rohrlich ............... | 382/309 |
| 5,517,578 | 5/1996 | Altman et al. ........................... | 382/187 |
| 5,592,566 | 1/1997 | Pagallo et al. ........................... | 382/187 |

FOREIGN PATENT DOCUMENTS

2 274 186   7/1994   United Kingdom .

OTHER PUBLICATIONS

H. Kojim et al., On–line Hand–drawn Line–figure Recognition and its Application, Nov. 1988, pp. 1138–1142, Institute of Electrical and Electronics Engineers vol. 2, No. 1988.

*Primary Examiner*—Bipin H. Shalwala
*Attorney, Agent, or Firm*—Young & Thompson

[57] ABSTRACT

A method and apparatus for changing a segment of one or more strokes which are to constitute any of characters and signs by recognizing a relationship in the position between the frame encompassing the strokes previously hand-written and a stroke newly hand-written; judging whether there is any requirement for changing the segment by referring the above recognized relationship in the position to predetermined relationships; recognizing, if there is no requirement, the above newly hand-written stroke as a stroke which constitutes, alone or in combination with strokes to be hand written later, a character other than the character encompassed by the frame; ascertaining, if there is a requirement, the above newly hand-written stroke as any of one or more changing-instruction strokes which identify predetermined types of strokes for changing the segment; and changing the above segment according to the changing-instruction stroke.

4 Claims, 6 Drawing Sheets connect divide into right and left divide into top and bottom connect divide into right and left divide into top and bottom

HANDWRITTEN CHARACTER RECOGNITION APPARATUS WITH AN IMPROVED FEATURE OF CORRECTION TO STROKE SEGMENTATION AND METHOD FOR CORRECTION TO STROKE SEGMENTATION FOR RECOGNITION OF HANDWRITTEN CHARACTER

BACKGROUND OF THE INVENTION

The present invention provides a method for correction of stroke segmentation for recognition of handwritten characters and a handwritten character recognition apparatus with an improved feature of correction to the stroke segmentation.

One of the conventional hand-written character recognitions is disclosed in IEEE Transaction on Pattern Analysis and Machine Intelligence, Vol. 12, No. Aug. 8, 1990, pp. 787–808. Strokes are drawn within fixed frames. If any stroke is drawn in a frame other than the frame within which strokes have previously been drawn, then the strokes previously drawn within the frame are segmented. It is however required to write strokes within the previously fixed frames. This method cannot be used to write strokes freely, such as when a person freely writes a character on a paper.

To solve the above problem, it is required to segment the strokes without using a frame. However, this method is likely to cause incorrect segmentation. It is therefore required to correct this incorrect segmentation.

In the prior art, there are several methods for correcting the segmentation of the strokes. One of the conventional correction methods is disclosed in Japanese laid-open Patent Application No. 59-2189. The user can correct the segmentation by using key boards. Another method for the correction of the segmentation is carried out by pushing correction switches provided on a hand-written character recognition apparatus. Still another method for the correction of the segmentation is carried out by writing a predetermined gesture on a tablet using a pen. However, in the prior art, there is no method for correction of the segmentation with reference to positions of a stroke newly hand-written in relation to a frame which encompasses previously hand-written strokes on a tablet by a pen.

SUMMARY OF THE INVENTION

Accordingly, it is an object of the present invention to provide an improved method for changing a segment of one or more strokes which are to constitute any of the characters and signs for hand-written character recognition.

It is another object of the present invention to provide an improved apparatus for changing a segment of one or more strokes which are to constitute any of the characters and signs for hand-written character recognition.

The above and other objects, features and advantages of the present invention will be apparent from the following descriptions.

The present invention provides a method for changing a segment of one or more strokes which are to constitute any characters and signs, the above strokes being hand-written by contacting a tool with a tablet, a segmentation of the above strokes for constituting any of the characters and signs being identified by a frame with a predetermined shape which encompasses the above strokes so that the above strokes encompassed by the above frame are recognized as constituting a character.

The above method comprises the steps of:

recognizing a relationship in the position between the above frame encompassing the above strokes previously hand-written and a stroke newly hand-written;

judging whether there is any requirement for changing the above segment by referring the above recognized relationship in the position to predetermined relationships;

recognizing, if there is no requirement, the above newly hand-written stroke as a stroke which constitutes, alone or in combination with strokes to be hand written later, a character other than the character encompassed by the above frame;

ascertaining, if there is any requirement, the above newly hand-written stroke as any of one or more changing-instruction strokes which identify predetermined types of changing the above segment; and changing the above segment according to the above changing-instruction stroke.

The present invention provides an apparatus for changing a segment of one or more strokes which are to constitute any characters and signs, the above strokes being hand-written by contacting a tool with a tablet, a segmentation of the above strokes for constituting any of the characters and signs being identified by a frame with a predetermined shape which encompasses the above strokes so that the above strokes encompassed by the above frame are recognized as constituting a character.

The above apparatus comprises:

section for recognizing a relationship in the position between the above frame encompassing the above strokes previously hand-written and a stroke newly hand-written;

section for judging whether there is any requirement for changing the above segment by referring the above recognized relationship in the position to predetermined relationships;

section for recognizing, if there is no requirement, the above newly hand-written stroke as a stroke which constitutes, alone or in combination with strokes to be hand written later, a character other than the character encompassed by the above frame;

section for ascertaining, if there is any requirement, the above newly hand-written stroke as any of one or more changing-instruction strokes which identify predetermined types of changing the above segment; and section for changing the above segment according to the above changing-instruction stroke.

BRIEF DESCRIPTION OF THE DRAWINGS

Preferred embodiments according to the present invention will be described in detail with reference to the accompanying drawings.

DESCRIPTION OF THE PREFERRED EMBODIMENT

A first embodiment according to the present invention will be described, wherein there is provided a novel method for correcting stroke segmentation for recognition of handwritten characters and a handwritten character recognition apparatus with an improved function for correction of stroke segmentation for the handwritten character recognition.

Figure 1:
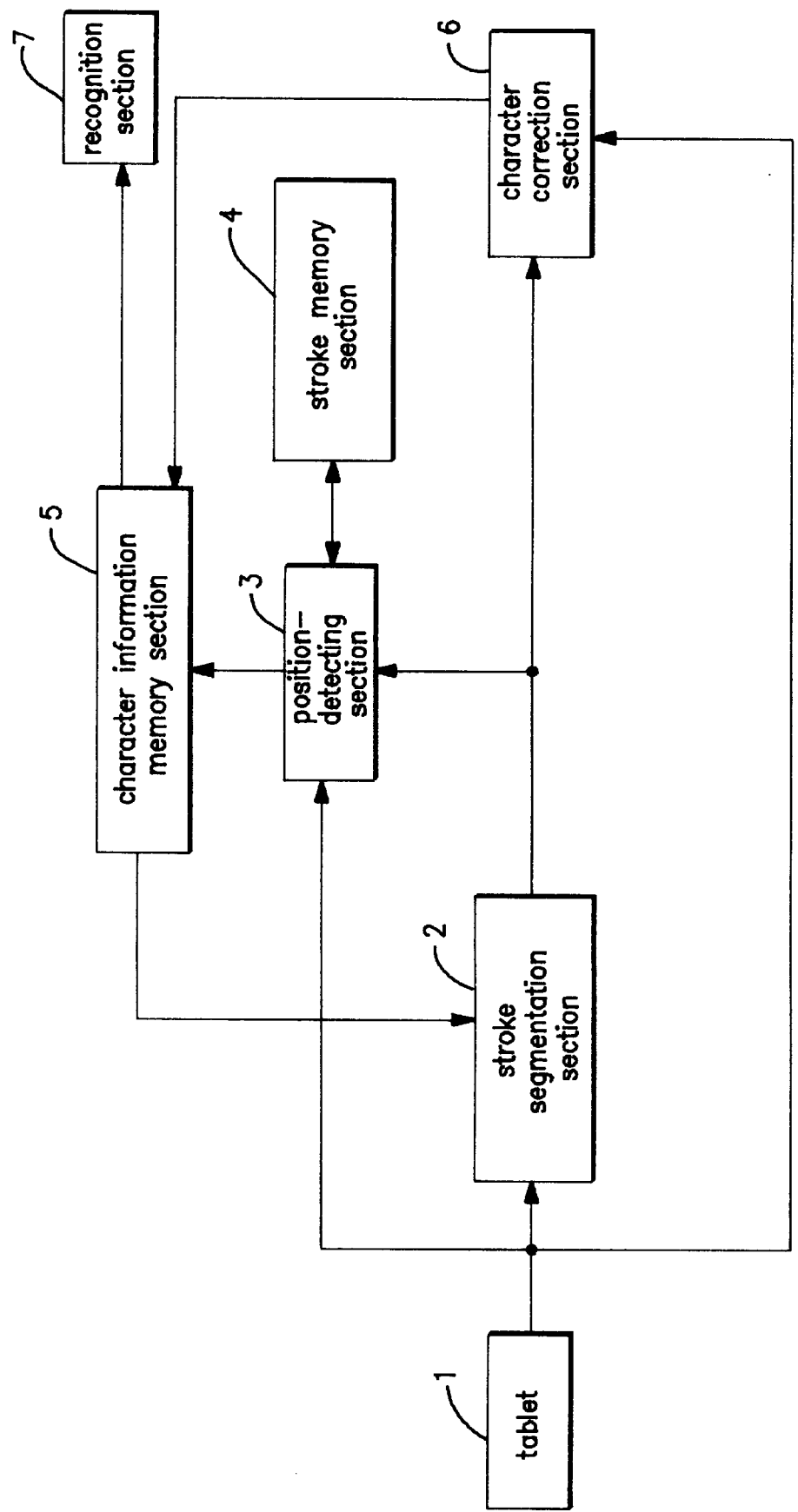
FIG. 1 is a block diagram illustrative of a novel apparatus for correcting a segmentation of strokes for hand-written character recognition according to the present invention.

The novel handwritten character recognition apparatus has a configuration illustrated in FIG. 1. A tablet 1 is provided for input of strokes, wherein one stroke is defined as a continuous handwriting line drawn from a pen-down to a pen-up, where the pen-down means that the pen is made into contact with the tablet while the pen-up means that the pen is made into disconnect from the tablet 1. A stroke segmentation section 2 is provided for segmentation of strokes inputted via the tablet 1. A position-detecting section 3 is provided for setting a circumscribing rectangular frame which encompasses each character comprising the strokes. A stroke memory section 4 is provided for temporarily storing strokes when setting the circumscribing rectangular frame which encompasses each character comprising the strokes. A character information memory section 5 is provided for storing both strokes which constitute a character and a circumscribing rectangular frame which encompasses the character. A character correction section 6 is provided for correcting the character. A recognition section 7 is provided for recognizing the character stored in the character information memory section 5.

Figure 2:
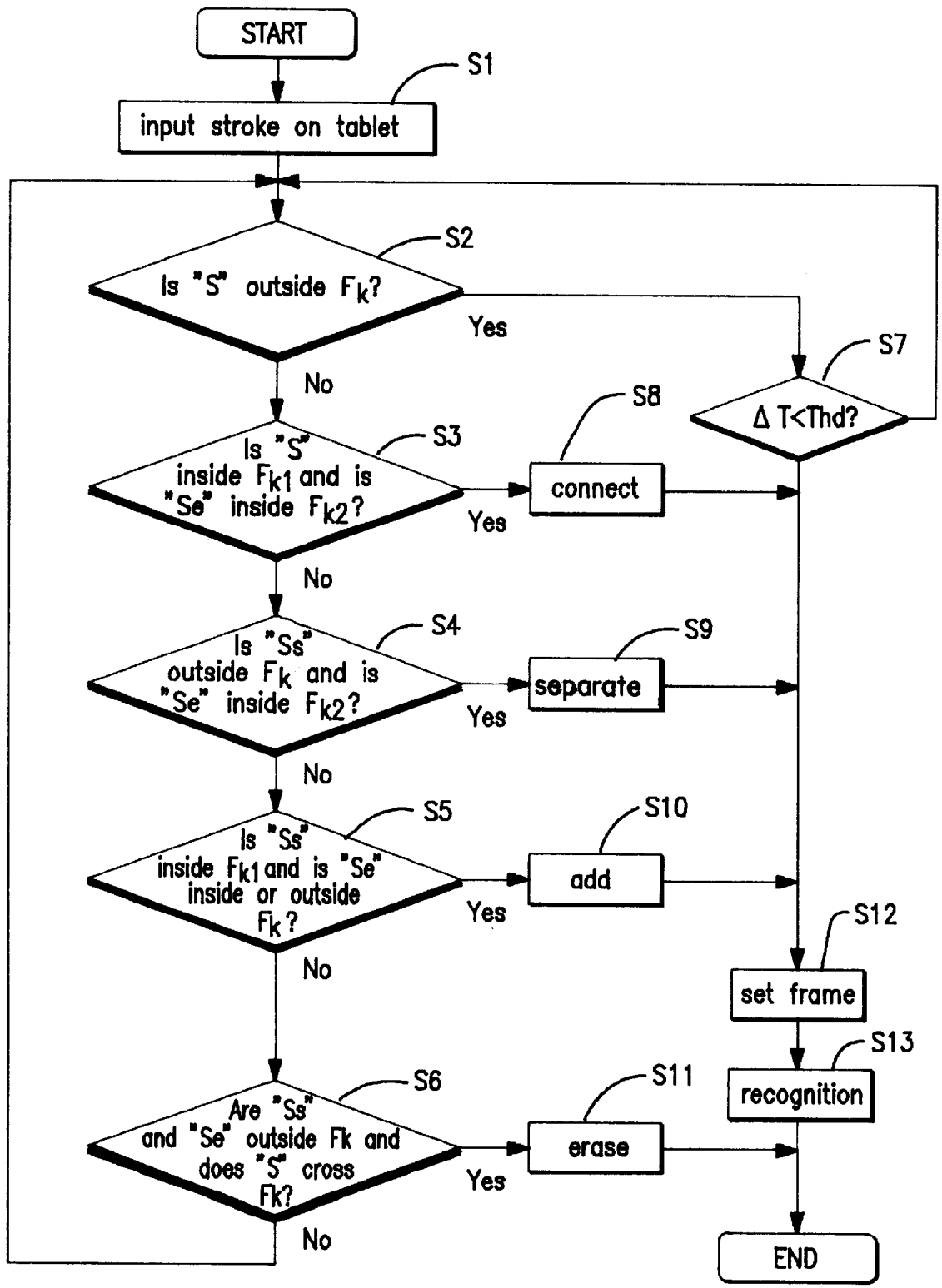
FIG. 2 is a flow chart illustrative of processes for correcting a segmentation of strokes for hand-written character recognition according to the present invention.

FIG. 2 is a flow chart illustrative of the processes for the character recognition. In a first step S1, strokes are drawn on the tablet by a pen so that the tablet recognizes locus of the pen, each of which is drawn from the pen-down to the pen-up. One continuous locus is recognized as one stroke. The stroke is recognized as a line which comprises a continuous alignment of points. Each point is recognized as X-Y coordinates. The tablet also recognizes a start time when the pen is made into contact with the tablet and a time when the pen is made into disconnect from the tablet.

Figure 3A:
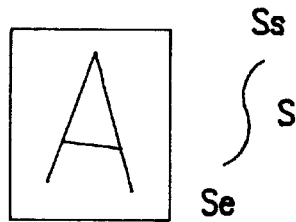
FIGS. 3A through 3E are views illustrative of correcting a segmentation of strokes for hand-written English character recognition according to the present invention.
Figure 3B:
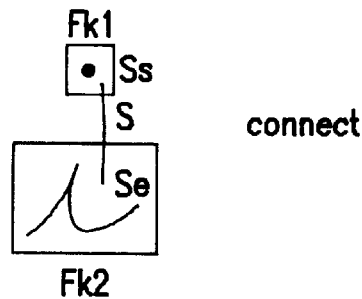

In a second step S2, the stroke segmentation section 2 compares the stroke pattern newly inputted in the tablet 1 with the circumscribing rectangular frame stored in the character information memory section 5. A relationship in position between the stroke "S" and the frame "Fk" is recognized by the position detecting section 3 to execute a segmentation of the stroke. If the entire part of the stroke S is positioned outside any frames "Fk" as illustrated in FIG. 3A, then a time difference between the starting time Ts and the end time Te is compared to a predetermined threshold value "Thd" in a step S7. If the time difference is larger than the predetermined threshold value "Thd", then this stroke is recognized as a character stroke which constitutes a character alone or in combination with the other strokes encompassed by the frame. If, however, the entire part of the stroke "S" is not positioned outside any frames Fk, then the process enters into a step S3. In this step S3, it is confirmed whether the start point Ss of the stroke S is positioned inside one frame and the end point of the stroke S is positioned inside another frame as illustrated in FIG. 3B. If the start point Ss of the stroke S is positioned inside one frame and the end point of the stroke S is positioned inside another frame, then this stroke is recognized as a connection stroke as a gesture but not as a character stroke so that any strokes inside the above two frames are recognized as constituting one character in a step S8. If these conditions are not satisfied, then it is confirmed whether the start point Ss of the stroke S is positioned outside any frames and the end point Se of the stroke S is positioned inside the frame in a step S4. As illustrated if FIG. 3C if the start point Ss of the stroke S is positioned outside any frames and the end point Se of the stroke S is positioned inside the frame, then this stroke is recognized as a dividing stroke as a gesture but not as a character stroke so that the frame is divided into two new frames by a vertical or horizontal straight line which includes the end point Se of the stroke S in a fourth step S4. If these conditions are not satisfied, then it is confirmed whether the start point Ss of the stroke S is positioned inside the frame and the end point Se of the stroke S is positioned inside or outside the frame in a fifth step S5. As illustrated in FIG. 3D, if the start point Ss of the stroke S is positioned inside the frame and the end point Se of the stroke S is positioned inside or outside the frame, then this stroke is recognized as an addition stroke as a gesture but not as a character stroke so that this stroke is added into the strokes encompassed by that frame whereby a combination of the added stroke with the original strokes is recognized as constituting one character encompassed by that frame in step S10. If these conditions are not satisfied, then it is confirmed whether the start point Ss of the stroke S is positioned outside any frames and also that the end point Se of the stroke S is also positioned outside any frames provided that the stroke pattern crosses at its one point each of parallel two sides of the rectangular frames in a sixth step S6. As illustrated in FIG. 3E, if the start point Ss of the stroke S is positioned outside any frames and the end point Se of the stroke S is also positioned outside any frames provided that the stroke pattern crosses at its one point each of parallel two sides of the rectangular frames, then this stroke is recognized as an erasure stroke as a gesture but not as a character stroke so that the original strokes encompassed by that frame are erased in a step S11.

The above steps will be described again in more detail. In the second step S2, if the stroke is recognized as a character stroke as illustrated in FIG. 3A, then the stroke segmentation section 2 fetches information about X-Y coordinates of the points aligned to constitute the stroke S as well as information of the start time Ts and the end time Te of the stroke S. The position-detecting section 3 fetches the information about the above information from the stroke segmentation section 2 to set a time difference between the start time Ts and the end time Te of the stroke S. Subsequently, the position-detecting section 3 compares the time difference with the predetermined value. If the time difference is smaller than the predetermined value, then it is recognized that the input operation of one character is not yet completed and then this stroke is temporarily stored in the stroke memory section 4. On the other hand, if the time difference is larger than the predetermined value, then it is recognized that the input operation of one character is not yet completed and then it enters into a step S12. In the step S12, the position-detecting section 3 fetches any strokes already stored in the stroke memory section 4 to recognize the fetched stroke as a character stroke which constitutes a character alone or in combination with other strokes. The position-detecting section 3 sets the maximum and minimum values of X-Y coordinates of each of the stroke or strokes constituting the character so as to set a circumscribing rectangular frame encompassing the character. The character information memory section 5 fetches the character pattern information and the circumscribing rectangular frame pattern information to store them.

If it is recognized that the stroke is a connection stroke as illustrated in FIG. 3B, any strokes encompassed by the first frame in which the start point Ss is positioned are integrated with any strokes encompassed by the second frame in which the end point Se is positioned so as to recognize a combination of the strokes in the first frame with the strokes in the second frame as a new character. Then, the position-detecting section 3 sets the maximum and minimum value X-Y coordinates of the new integrated character pattern so as to set a circumscribing rectangular frame encompassing the new integrated character. The character information memory section 5 fetches the integrated character pattern information and the circumscribing rectangular frame pattern information to store them.

Figure 3C:
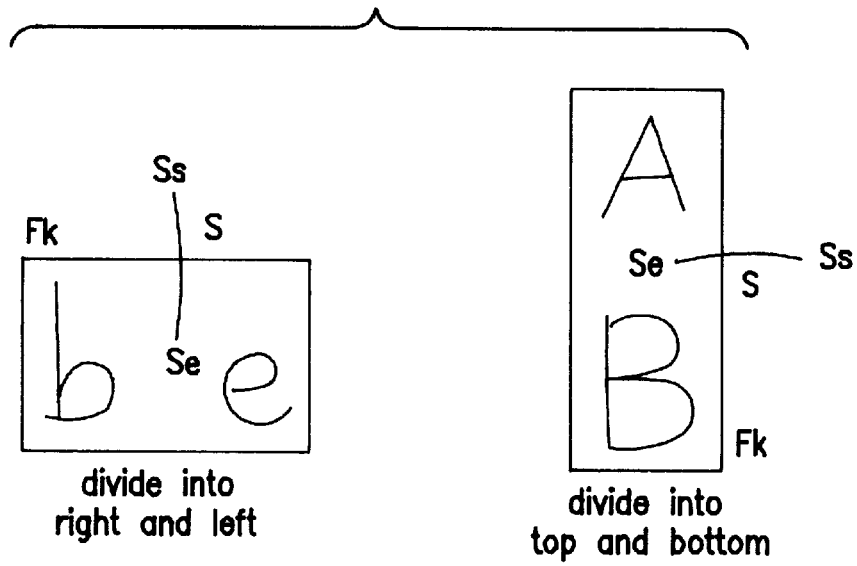
Figure 3D:
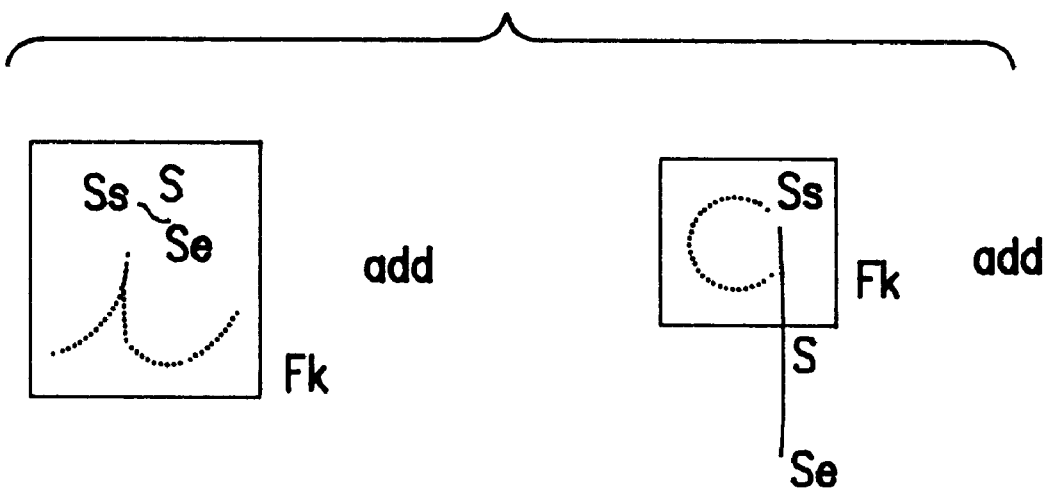
Figure 3E:
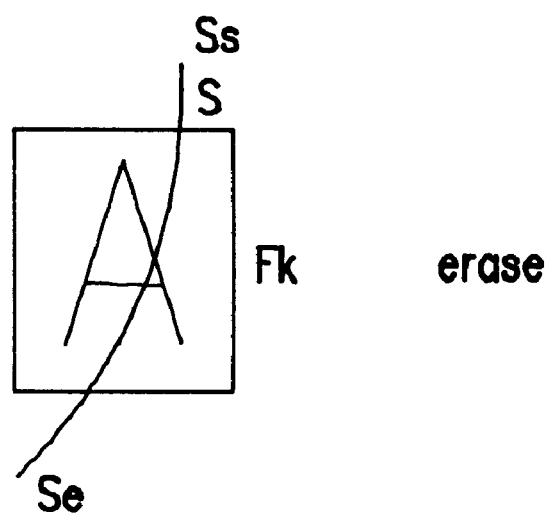
Figure 4A:
FIGS. 4A through 4E are views illustrative of correcting a segmentation of strokes for hand-written Chinese character recognition according to the present invention.
Figure 4B:
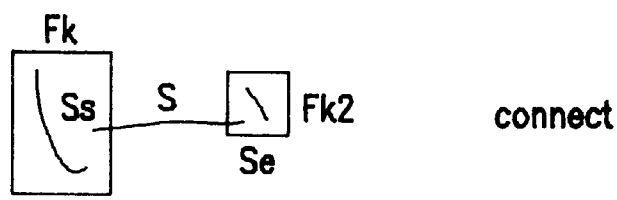
Figure 4C:
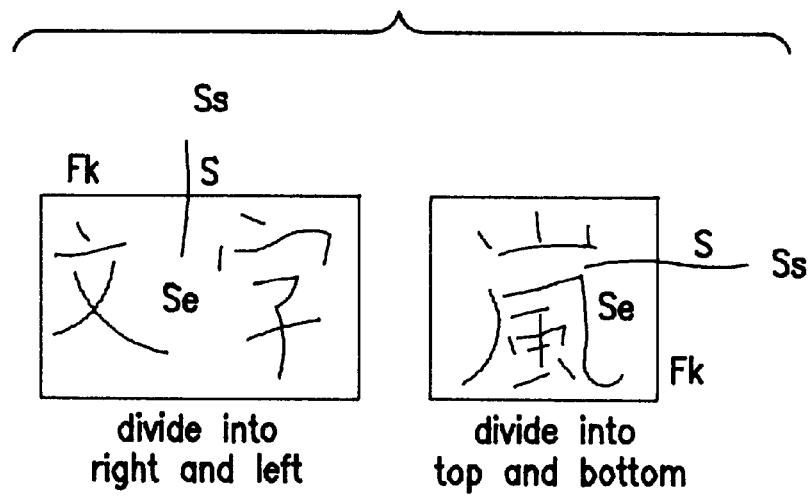
Figure 4D:
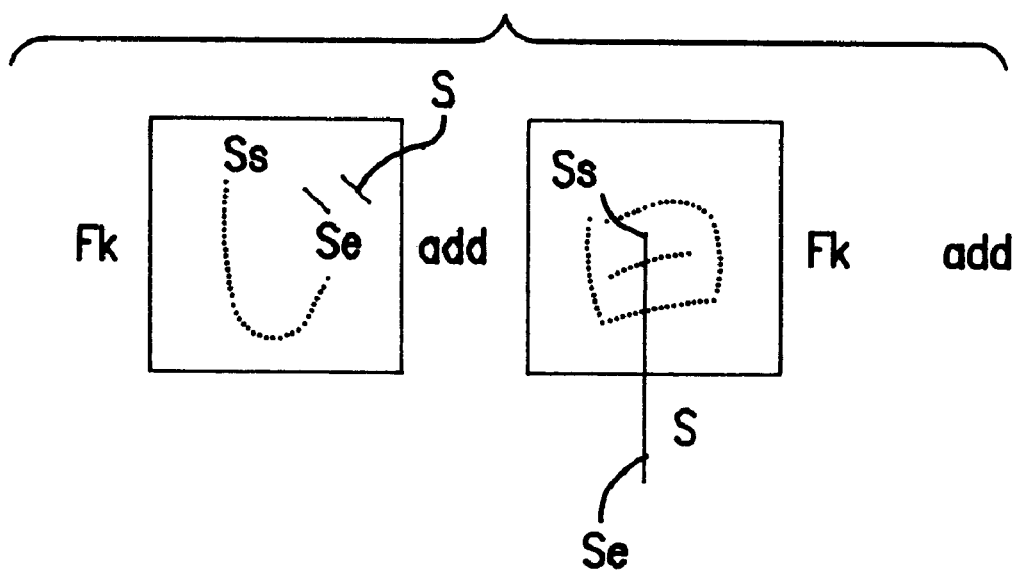
Figure 4E:
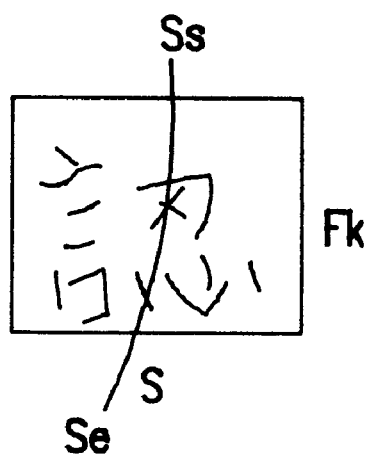

If it is recognized that the stroke is a division stroke as illustrated in FIG. 3C, then the frame is divided into top and bottom parts or left and right parts. At this time, a difference |Xe−Xs| in the X-coordinate between the start point Ss and the end point Se of the stroke S is compared to a difference |Ye−Ys| in the Y-coordinate between the start point Ss and the end point Se. If the difference |Xe−Xs| is smaller than the difference |Ye−Ys|, then the frame Fk is divided into a left frame Fkl and a right frame Fkr by a vertical straight line which includes the end point Se. Then, any strokes encompassed in the left frame Fkl are newly recognized as constituting a character Ckl, while any strokes encompassed in the right frame Fkr are newly recognized as constituting a character Ckr. The position-detecting section 3 set circumscribing rectangular frames encompassing the characters in the left and right frames Fkr and Fkl. The character information memory section 5 fetches the character pattern information of the characters encompassed by the left and right frames Fkl and Fkr as well as the left and right frame pattern information so as to store them.

On the other hand, if the difference |Xe−Xs| is equal to or larger than the difference |Ye−Ys|, the frame Fk is divided into an upper frame Fku and a lower frame Fkl by a horizontal straight line which includes the end point Se. Then any strokes encompassed in the upper frame Fku are newly recognized as constituting a character Cku, while any strokes encompassed in the lower frame Fkl are newly recognized as constituting a character Ckl. The position-detecting section 3 set circumscribing rectangular frames encompassing the characters in the upper and lower frames Fku and Fkl. The character information memory section 5 fetches the character pattern information of the characters encompassed by the upper and lower frames Fku and Fkl as well as the upper and lower frame pattern information so as to store them.

In the above amendment to the segmentation by dividing the frame into new frames, there is a possibility that a stroke extends across the boundary between the divided two frames. In this case, the stroke is recognized as belonging to one frame in which the majority part of the stroke is included.

If it is recognized that the stroke is an addition stroke as illustrated in FIG. 3D, then this new stroke is added to the original strokes encompassed by the frame which includes the start point Ss of this stroke so that a combination of this new stroke with the original strokes is regarded as constituting a character. The position-detecting section 3 sets a new circumscribing rectangular frame which encompasses the new character. The character information memory section 5 fetches the character pattern information and the new frame to store them.

If it is recognized that the stroke is an erasure stroke as illustrated in FIG. 3E, then information of the original stroke different from this stroke and encompassed by the frame as well as information of the frame are erased from the character information memory section 5.

The character patterns stored in the character information memory section 5 are recognized as characters by an available character recognition method such as pattern matching and others. The pattern matching method is mentioned in Proceeding of the Second International Conference on Document An Analysis And Recognition, and also mentioned in On-Line Japanese Character Recognition Experiments By An Off-Line Method Based On Normalization-Cooperated Feature Extraction, October 1993, pp. 204–207. This pattern matching method does not rely upon the number of character strokes or the order of the character strokes. The pattern matching method extracts the four-directional features of the strokes constituting the character for conducting non-linear formalization to obtain a high recognition ability.

Various modifications of the above embodiment are available. For example, the above segmentation of the strokes may be varied by changing the relationship in position between the character and the stroke. If a stroke encompasses a circumscribing rectangular frame, then this stroke is recognized as an erasure stroke indicating that a character or strokes encompassed by the circumscribing rectangular frame should be deleted. Alternatively, if a stroke crosses two times one side of a circumscribing rectangular frame, then this stroke is recognized as an erasure stroke indicating that a character or strokes encompassed by the circumscribing rectangular frame should be deleted. Further if a stroke encompasses two circumscribing rectangular frames, then this stroke is recognized as a connection stroke indicating that the strokes encompassed by one circumscribing rectangular frame should be recognized as constituting one character in combination with the strokes encompassed by another circumscribing rectangular frame. The shape of the frame may be varied. For example, triangular or circular-shaped circumscribing frames may be used.

Various methods for segmentation of the strokes constituting any character are available. One of the segmentation methods is disclosed in Japanese laid-open Patent Application No. 3-141,484, wherein the segmentation is made on the bases of the projection distribution of black pixels of the character.

Various methods for recognition of the character are available. One of the recognition methods is to find an optimum solution by changing combinations of strokes which constitute a character.

As described above, the method for changing the segmentation of strokes which constitute any character is carried out with reference only to a relationship in position between the previously written strokes encompassed by any frame and the latest stroke. This provides a convenience to the user when the segmentation correction is required.

FIGS. 4A through 4E are illustrative of one example for recognition of a newly inputted stroke as a stroke which identifying any correction of the segmentation of the previously inputted strokes which constitute a Chinese character, namely Kanji.

Whereas modifications of the present invention will be apparent to a person having ordinary skill in the art, to which the invention pertains, it is to be understood that embodiments as described and shown by way of illustrations are by no means intended to be considered in a limiting sense. Accordingly, it si to be intended to cover by claims all modifications which fall within the spirit and scope of the present invention.

What is claimed is:

1. A method of recognizing and implementing a frame or character correction instruction in a stroke that is newly hand-written with a tool on a table in a positional relationship to frames that are external to and encompass prior hand-written strokes that each constitute a character or sign, the method comprising the steps of:

recognizing the positional relationship between the frames and the newly written stroke by determining whether the newly written stroke's start point and end point are positioned inside or outside of the frames and whether the newly written stroke crosses the frames;

when the positional relationship is that the newly written stroke's start point is inside a first frame, recognizing the newly written stroke as a requirement to connect the first frame to a second frame when the newly written stroke's end point is inside the second frame, and recognizing the newly written stroke as a requirement to add the newly written stroke to the prior hand-written stroke in the first frame when the newly written stroke's end point is inside the first frame or outside all of the frames;

when the positional relationship is that the newly written stroke's start point is outside all of the frames, recognizing the newly written stroke as a requirement to divide one of the frames when the newly written stroke's end point is inside the one frame; and implementing the requirement recognized in the newly written stroke by connecting the frames, adding to the character within one of the frames, or dividing one of the frames in the manner set forth in the instruction provided in the positional relationship of the newly written stroke to the frames.

2. The method as claimed in claim 1, wherein said recognition of the relationship in the position between said frames encompassing said strokes previously hand-written and said stroke newly hand-written is carried out with reference to X-Y coordinates which are set on said tablet.

3. The method as claimed in claim 1, further comprising the steps of:

ascertaining whether the start point and the end point are positioned outside of any of said frames, and the newly written stroke crosses at one point each of parallel two sides of a rectangular one of the frames; and recognizing the newly written stroke as a requirement for deleting prior hand-written strokes encompassed by said rectangular one of the frames.

4. A method of recognizing and implementing a frame or character correction instruction in a stroke that is newly handwritten with a tool on a table in a positional relationship to frames that are external to and encompass prior hand-written strokes that each constitute a character or sign, the method comprising the steps of:

recognizing the positional relationship between the frames and the newly written stroke by determining whether the newly written stroke's start point and end point are positioned inside or outside of the frames and whether the newly written stroke crosses the frames;

when the positional relationship is that the newly written stroke's start point is inside a first frame, recognizing the newly written stroke as a requirement to perform a first corrective action when the newly written stroke's end point is inside a second frame, and recognizing the newly written stroke as a requirement to perform a second corrective action different from the first corrective action when the newly written stroke's end point is inside the first frame or outside all of the frames;

when the positional relationship is that the newly written stroke's start point is outside all of the frames, recognizing the newly written stroke as a requirement to perform a third corrective action different from the first and second corrective actions when the newly written stroke's end point is inside the one frame; and implementing the requirement recognized in the newly written stroke by performing the first, second, or third corrective action in accordance with the instruction provided in the positional relationship of the newly written stroke to the frames.

* * * * *